United States Patent
Aufranc et al.

(10) Patent No.: US 8,020,997 B2
(45) Date of Patent: Sep. 20, 2011

(54) DEFINING A BOUNDING BOX FOR PROJECTED IMAGES

(75) Inventors: Richard Aufranc, Albany, OR (US); Bruce A. Stephens, Corvallis, OR (US); Olan Way, Eugene, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 768 days.

(21) Appl. No.: 11/973,456

(22) Filed: Oct. 9, 2007

(65) Prior Publication Data

US 2009/0091714 A1   Apr. 9, 2009

(51) Int. Cl.
   *G03B 21/26* (2006.01)
(52) U.S. Cl. ........... 353/30; 353/28; 353/42; 353/94
(58) Field of Classification Search .......... 353/30–34, 353/69, 70, 94, 28, 29, 42; 348/745, 747
   See application file for complete search history.

(56) References Cited

U.S. PATENT DOCUMENTS

| | | | |
|---|---|---|---|
| 5,574,835 A | 11/1996 | Duluk, Jr. et al. | |
| 6,753,907 B1 | 6/2004 | Sukthankar et al. | |
| 6,791,542 B2 | 9/2004 | Matusik et al. | |
| 7,119,833 B2 | 10/2006 | Jaynes et al. | |
| 7,125,122 B2 | 10/2006 | Li et al. | |
| 2003/0231173 A1 | 12/2003 | Matusik et al. | |
| 2004/0091084 A1 | 5/2004 | Griffith | |
| 2004/0101191 A1 | 5/2004 | Seul et al. | |
| 2005/0063582 A1 | 3/2005 | Park et al. | |
| 2005/0184958 A1* | 8/2005 | Gnanamgari et al. | 345/157 |
| 2006/0098167 A1* | 5/2006 | Sato | 353/35 |
| 2007/0040800 A1* | 2/2007 | Forlines et al. | 345/158 |
| 2007/0242233 A1* | 10/2007 | Sokeila et al. | 353/69 |

FOREIGN PATENT DOCUMENTS

GB 2399631 A 9/2004

* cited by examiner

*Primary Examiner* — Thanh X Luu

(57) ABSTRACT

A system for defining a bounding box include one or more image projectors; one or more optical beam generators; a display surface; a computing element; and a digital image sensor. The digital image sensor is configured to sense a location of image orientation indicators generated by the optical beam generators. The computing element is configured to communicate with the digital image sensor to determine a bounding box defined by the locations of the image orientation indicators and to control the one or more image projectors to project an image in, and corresponding to, the bounding box on the display surface.

20 Claims, 11 Drawing Sheets

Fig. 11a
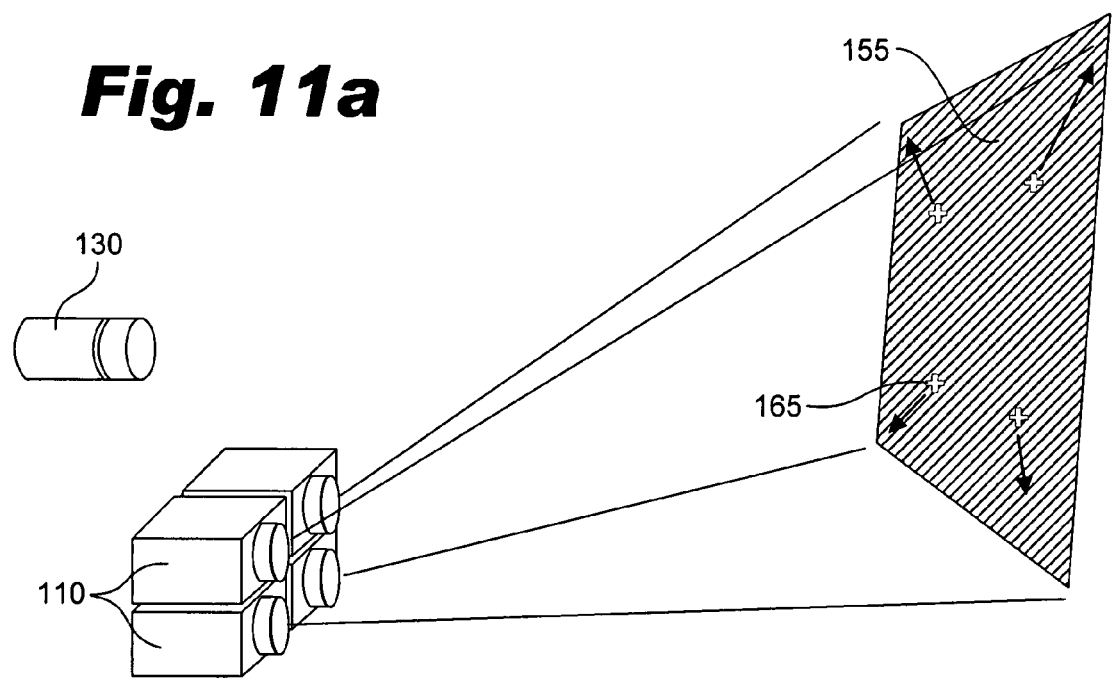
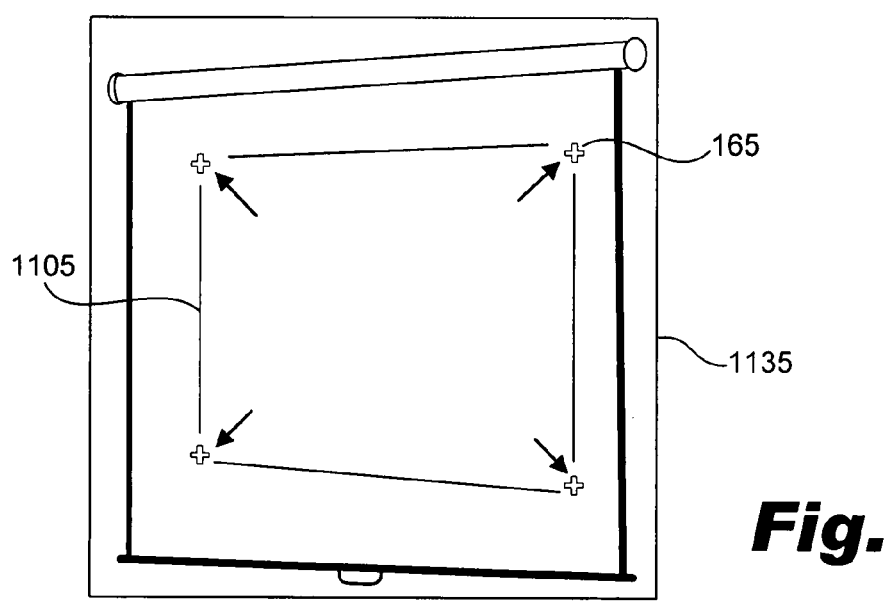
Fig. 11b

DEFINING A BOUNDING BOX FOR PROJECTED IMAGES

BACKGROUND

Various devices for displaying images exist. One example is digital image projectors. Digital image projectors are widely used to project color images generated from digital signals onto a display surface. In some cases, the display surface may be the front of a reflective display screen, for example, in a theater or conference-room. In other cases, the display surface may be the rear of a semi-transparent diffusive screen of a rear-projection display monitor or projection television.

Portable digital image projectors are common. Such digital image projectors, while connected to a personal computer or other image/video signal source, typically sit on a supporting surface and are directed at a display surface on which images or video is to be shown. Many of these projectors use transmissive or reflective liquid crystal displays. Other such projectors use different imaging devices, such as digital micromirrors. These projectors can display images one at a time or as a sequence of images, as in the case of video.

Digital projectors are typically designed so that undistorted rectangular images are projected on the display surface when the projector is placed horizontally on a level support surface with the projector's optical axis lined up perpendicular to the display surface. However, if this alignment or orientation is not made, the resulting image on the display surface may be distorted. In many cases, the distorted image will appear as a trapezoid or an arbitrarily shaped quadrilateral. The non-rectangular shape of the resulting projected image is referred to as keystoning.

BRIEF DESCRIPTION OF THE DRAWINGS

The accompanying drawings illustrate various embodiments of the principles described herein and are a part of the specification. The illustrated embodiments are merely examples and do not limit the scope of the claims.

FIG. 11a is an illustration of a method for defining a bounding box according to principles described herein.

FIG. 11b is an illustration of an image that may be displayed to a user during the course of a method for defining a bounding box according to principles described herein.

Throughout the drawings, identical reference numbers designate similar, but not necessarily identical, elements.

DETAILED DESCRIPTION

Figure 1:
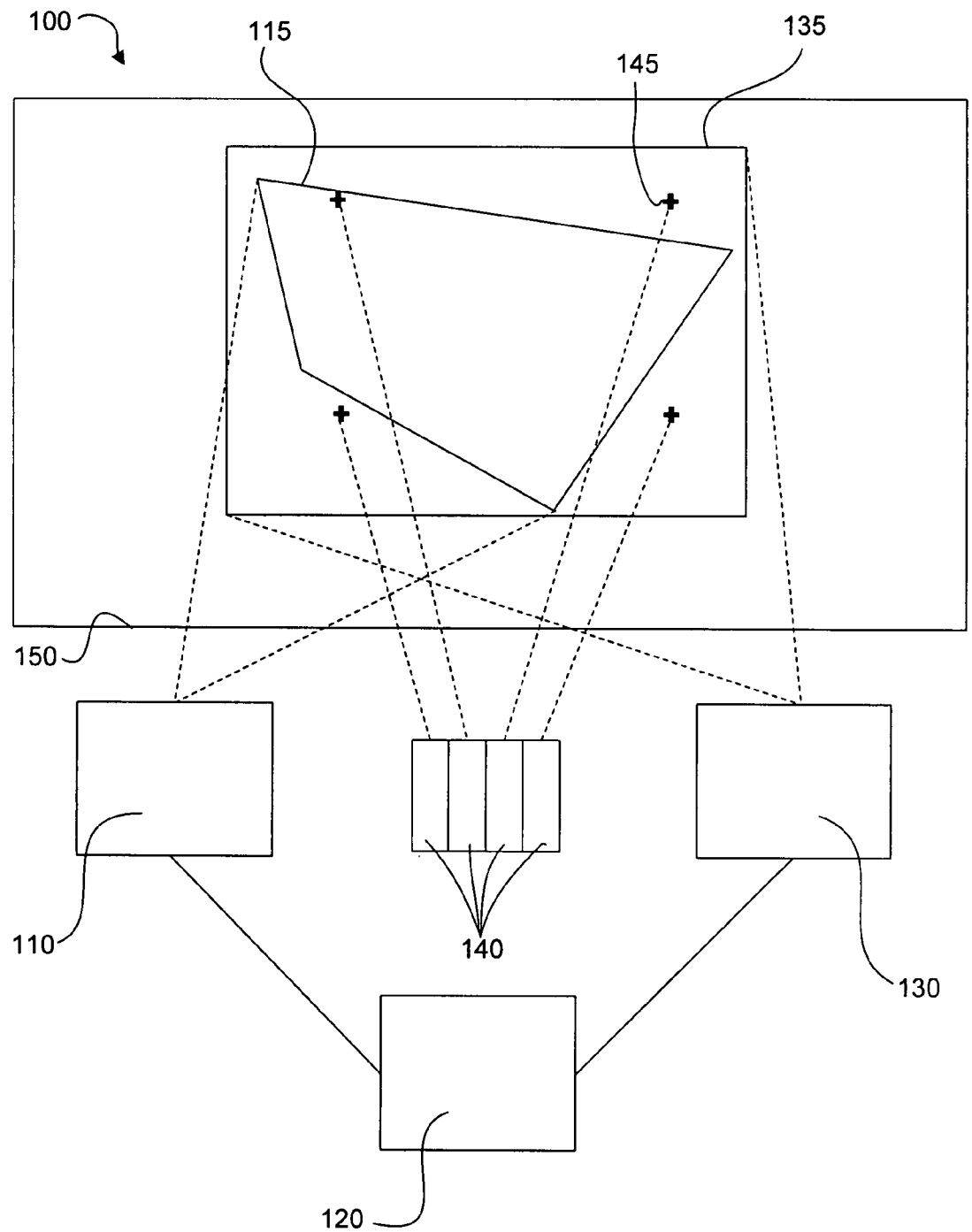
FIG. 1 is a diagram of an illustrative system according to principles described herein.

As indicated above, unless a projector is carefully aligned with a corresponding display surface (e.g., a projection screen), the resulting image on the display surface can appear distorted, or "keystoned." As used herein and in the appended claims, "keystoning" refers to a projected image that has a non-rectangular shape due to misalignment between the display surface and the projector or projectors that are projecting the image. As above, such an image may also be referred to as "keystoned."

Keystoning is undesirable, not only because viewers find this warping to be distracting, but also because the distortion can significantly affect the interpretation of visual information such as graphs, bar charts and technical drawings that are being displayed. Keystoning can be prevented or corrected by aligning the projection system's optical axis so that it is perpendicular to the display surface and ensuring that the image is not rotated with respect to the display surface.

Consequently, one technique to eliminate keystoning is to manually adjust the physical position of the digital image projector by moving it around with respect to the corresponding display surface, tilting and rotating the projector, etc., until an image without keystoning, i.e., a near rectangular image, is displayed. However, in many situations, it may not be feasible to sufficiently physically adjust the position of the projector. For example, a properly oriented support surface relative to the display surface may not be available. In other examples, the projector may be positioned at an angle above or below the display surface due to the configuration of the projection area.

Some projectors can help adjust for keystoning electronically, without physically moving or reorienting the projector. This is done by making adjustments to the optical axis of the projector by, for example, adjusting the position of optical elements within the projector or adjustable support structures integrated into the projector housing. The image being produced by the projector can also be skewed electronically to compensate for keystoning.

Such solutions may involve a menu-based approach in which a menu system is provided to the user. The user is then able to adjust keystoning and other distortions by changing certain parameters within the menu system. However, controlling the variety of parameters in a projector to make these adjustments to correct keystoning can be complicated and time consuming and beyond the ability of many users. Another such solution requires the user to manually adjust elements of the projection system to eliminate keystoning. This can also be time consuming and further requires the user to have physical access to the projector.

With respect to keystoning, some projection systems have additional complications. Some projection systems exist that utilize more than one projector. In some such systems, the projected images from multiple projectors are "tiled" in order to form a bigger image or several smaller images. In other multi-projector systems, the projected images from different projectors may be superimposed in order to improve resolution, sharpness, brightness, contrast, etc. These systems may also provide redundancy. In multi-projector systems, however, keystoning may be an issue with each projector in the system, thereby compounding the adjustments that are necessary to avoid or correct distortion. Each individual projected image, and the total composite image, must be adjusted so that the resulting image appears to have right angled corners.

In both single and multi-projector projection systems, in order to solve a keystoning problem, it may be helpful for the user to define a bounding box. As used herein and in the appended claims, the term "bounding box" refers to a box defined on the display surface in which the projected image is to appear. Typically, the bounding box is rectangular, but this is not necessarily so. The bounding box may be marked with lines, physical structure, projected light or any other means of indicating the boundary or outline of the bounding box. In creating the bounding box, the user may determine the desired size and aspect ratio of the projected image. Defining a bounding box for projected images can be difficult.

To address the issues involved in defining a bounding box for projected images, the present specification provides various systems and methods for easily and intuitively defining bounding boxes. The principles of the presence specification enable a user to easily define a bounding box that may then be used to align and display a projected image. The methods discussed below are especially useful in multi-projector systems that involve aligning and displaying a 'tiled' image.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to illustrative systems and methods.

Illustrative Systems

FIG. 1 is a diagram showing an illustrative system (100) according to the principles of the present specification. The system (100) includes a digital image projector (110), a computing element (120), a digital image sensor (130), one or more optical beam generators (140) and a display surface (150). In the system (100) of the present embodiment, four optical beam generators (140) are provided. The optical beam generators (140) are preferably laser pointing devices. These laser pointing devices (140), in some embodiments, may be grouped together into a single unit that allows each device to be directed by a user and retain its positioning. The digital image sensor (130) may be a digital camera, a digital video camera, a "web-cam", or other type of imaging device. The image sensor (130), computing element (120), and image projector (110) of the present embodiment are connected through a wired connection, although in alternative embodiments wireless connections may be utilized.

The computing element (120) of the present embodiment may be a desktop computer, laptop, server or other computing device. In other embodiments, the computing element (120) may be integrated into the digital image projector (110). The digital image sensor (130) and optical beam generators (140) may also be integrated into the image projector (110) in some embodiments.

The display surface (150) may be a screen, wall, or other surface suitable for viewing projected images. In some instances, the display surface (150) may be reflective and configured to be viewed from the same side on which the image from the projector (110) is received. In other embodiments, the display surface may be transmissive and configured so as to allow the image (115) to be viewed from the opposite side of the surface (150) onto which it is projected.

In the system (100) of the present embodiment, the optical beam generators are directed towards the display surface (150), creating orientation indicators (145) on the display surface (150). In the present embodiment, these indicators (145) are adjusted by the user until they are located at approximately the four corners of the desired bounding box. This bounding box may or may not currently encompass or correspond to the image (115) projected by the image projector (110), which is shown in this figure as an irregular polygon to represent the distortions that may be caused by a misaligned projector (110). The digital image sensor (130) is configured so as to be able to sense the desired bounding box as defined by the indicators (145) i.e., the portion (135) of the display surface (150) upon which the image (115) is desired to be projected.

After the orientation indicators (145) have been adjusted by a user, the image sensor (130) images the display surface including the orientation indicators (145). From this image, the computing element (120) determines the relative positions of the indicators (145) on the display surface (150). For example, an algorithm can process the image starting at the center and scanning outwards until the indicators (145) are identified. For example, the scan could be spiral, radial or raster starting in the center. The indicators (145) can be identified by a particular number of clustered image pixels of a particular color, shape or other characteristic indicative of the orientation indicators (145). The computing element (120) can then use this information to interpolate the desired bounding box within the field of view of the image sensor (130) and in correspondence with the display surface. The computing element (120) of the present embodiment may include a user interface that displays, and allow the user to change, certain parameters of the bounding box.

Upon the calculation of the bounding box, the computing element (120) may control the projector (110) to display the image received from the image sensor (130) with the bounding box overlaid or superimposed on the projected image. Also displayed may be text or other indicators of the size, aspect ratio, etc. of the bounding box. At this point the user may either change the details of the bounding box or accept them. For instance, the computing element (120) may display corner markers and allow the user to manipulate them to make adjustments to the bounding box's location or size. Once the bounding box has been accepted, the computing element (120) may communicate with the projector (110) and adjust the projected image until the projected image (115) fills the bounding box specified by the user.

Figure 2:
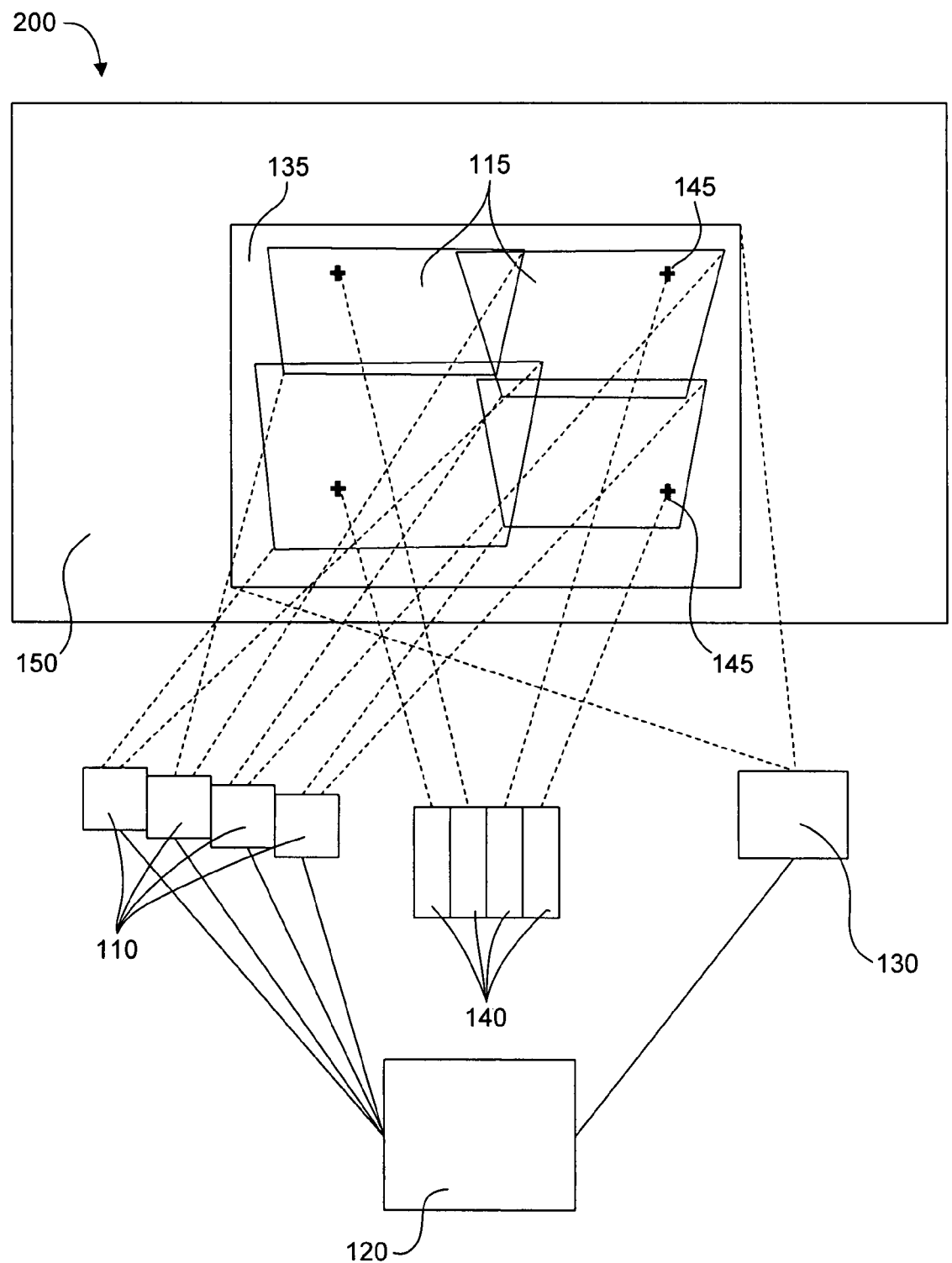
FIG. 2 is a diagram of an illustrative system according to principles described herein.

Turning now to FIG. 2, another illustrative system (200) is shown. The illustrative system (200) is similar to the system (100, FIG. 1) described above except that it includes a plurality of image projectors (110). In this embodiment, the computing element (120) would be required to determine the adjustments necessary for each projector (110) in order for the resulting image (155, FIG. 3) to fill the bounding box specified by the four optical beam generators (140). Although the embodiments discussed thus far have included four such optical beam generators (140), other numbers may also be used. In one such alternative embodiment, only one optical beam generator (140) may be used. The optical beam generator (140) could be used to generate an orientation indicator (145) where a corner of the bounding box should be located. The image sensor (130) then captures the orientation indicator's (145) position. This process would be repeated for the other corners of the desired bounding box.

Once a bounding box has been defined, the computing element (120) may begin adjusting the images (115) projected by the image projectors (110) based on the specified bounding box until the desired image (155, FIG. 3) is achieved. This process may include iterative communication between the image projectors (110), computing element (120), and the image sensor (130).

Figure 3:
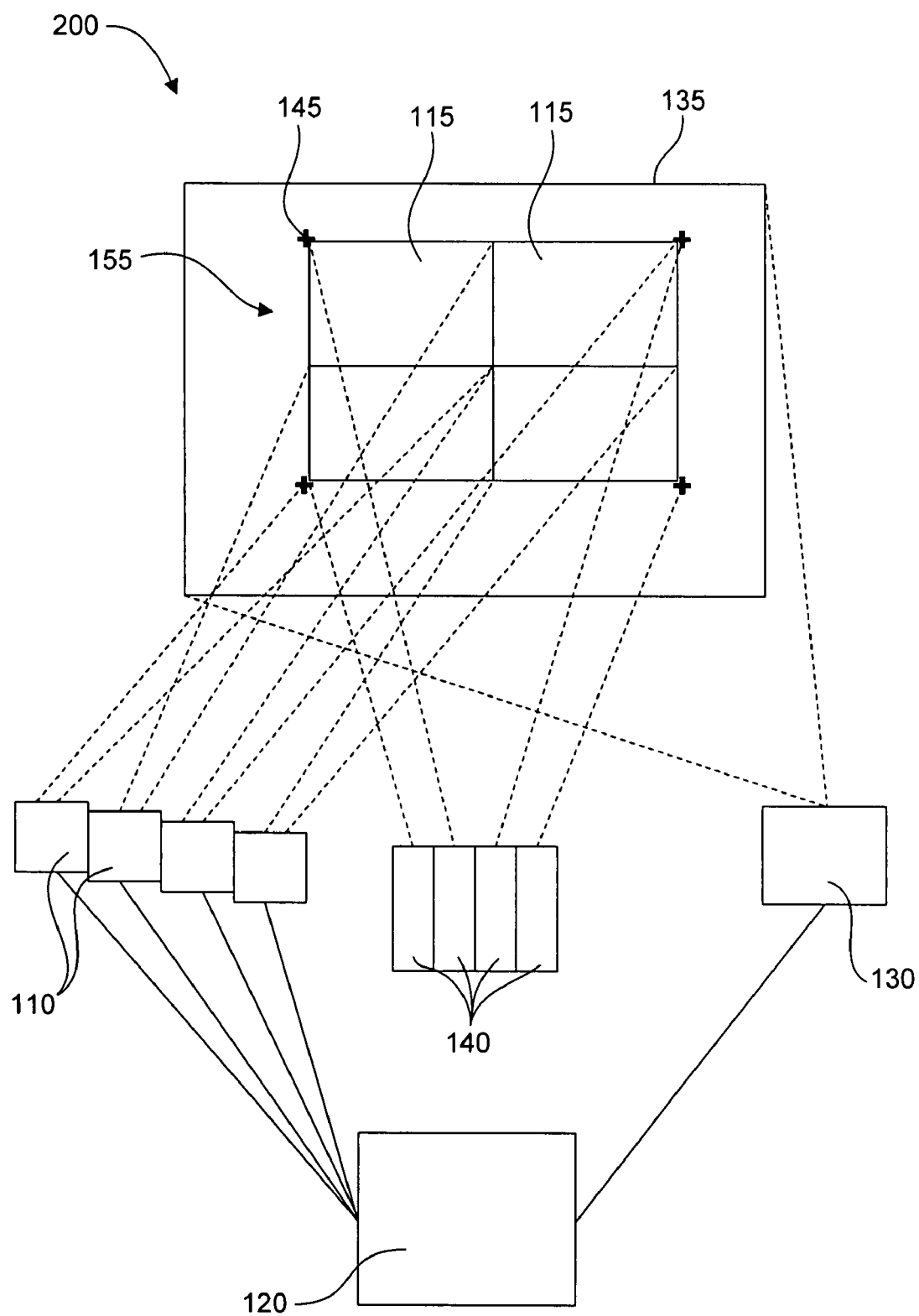
FIG. 3 is a diagram of an illustrative system according to principles described herein.

Turning now to FIG. 3, an illustrative system (200) is shown after the computing element (120) has finished aligning and correcting the keystoning of the images (115) projected by the digital image projectors (110). The keystoning of the images (115) projected by the individual projectors (110) has been corrected, as well as the keystoning of the conglomerate image (155). The individual images (115) have been appropriately tiled to create one large image (155). At this point, the image orientation indicators (145) may no longer be needed, and so the optical beam generators (140) may be turned off.

Figure 4A:
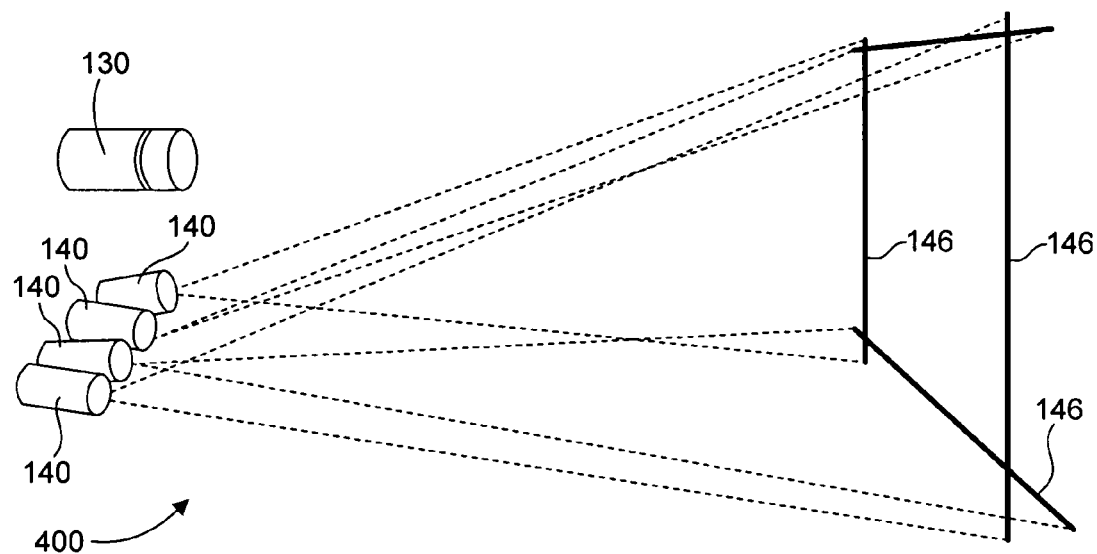
FIG. 4a is an illustration of an illustrative system according to principles described herein.
Figure 4B:
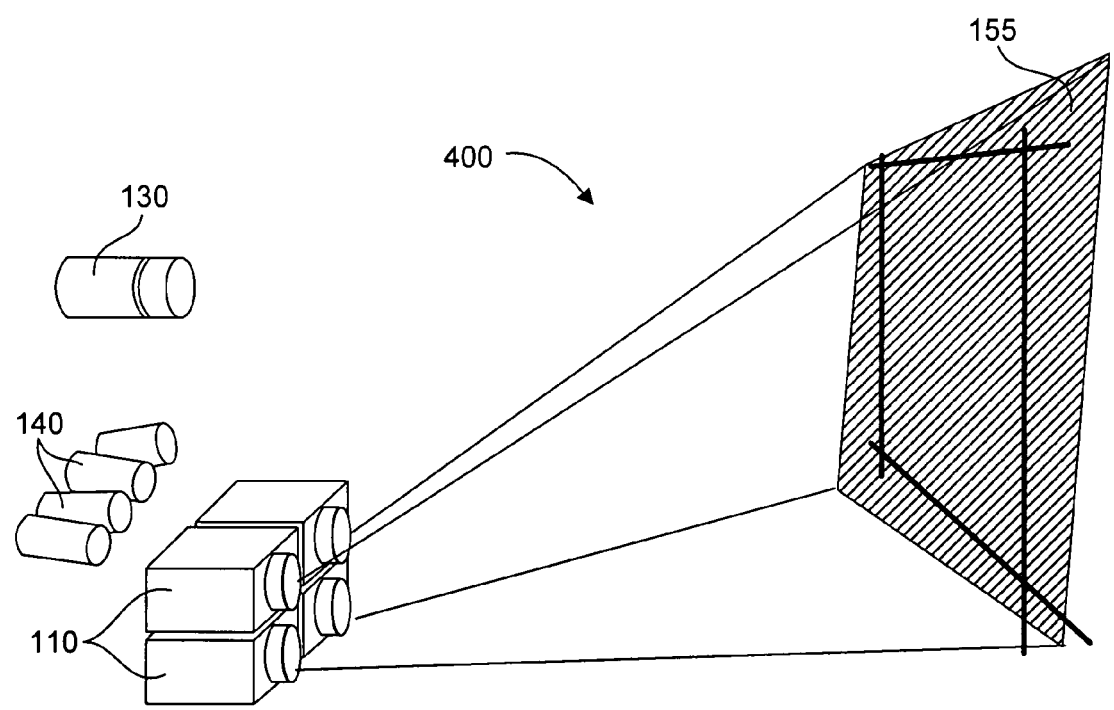
FIG. 4b is an illustration of an illustrative system according to principles described herein.

FIGS. 4a and 4b illustrate a portion of an alternative system (400) for defining a bounding box. As can be seen in FIG. 4a, four optical beam generators (140) each project a visible line. These lines serve as the image orientation indicators (146) for defining a bounding box. As before, the beam generators are manipulated by the user, either manually or by automated systems, until the desired bounding box is defined by the lines (146) projected by the beam generators (140).

Turning now to FIG. 4b, a plurality of projectors (110) are shown. The projectors (110) may be aimed at the display surface to fill the desired bounding box. By detecting the visible bounding box using an optical sensor and using the projected bounding box as reference, image keystone is corrected by the computing element, and the projected image (155) may be fitted to the bounding box.

Illustrative Methods

Figure 5:
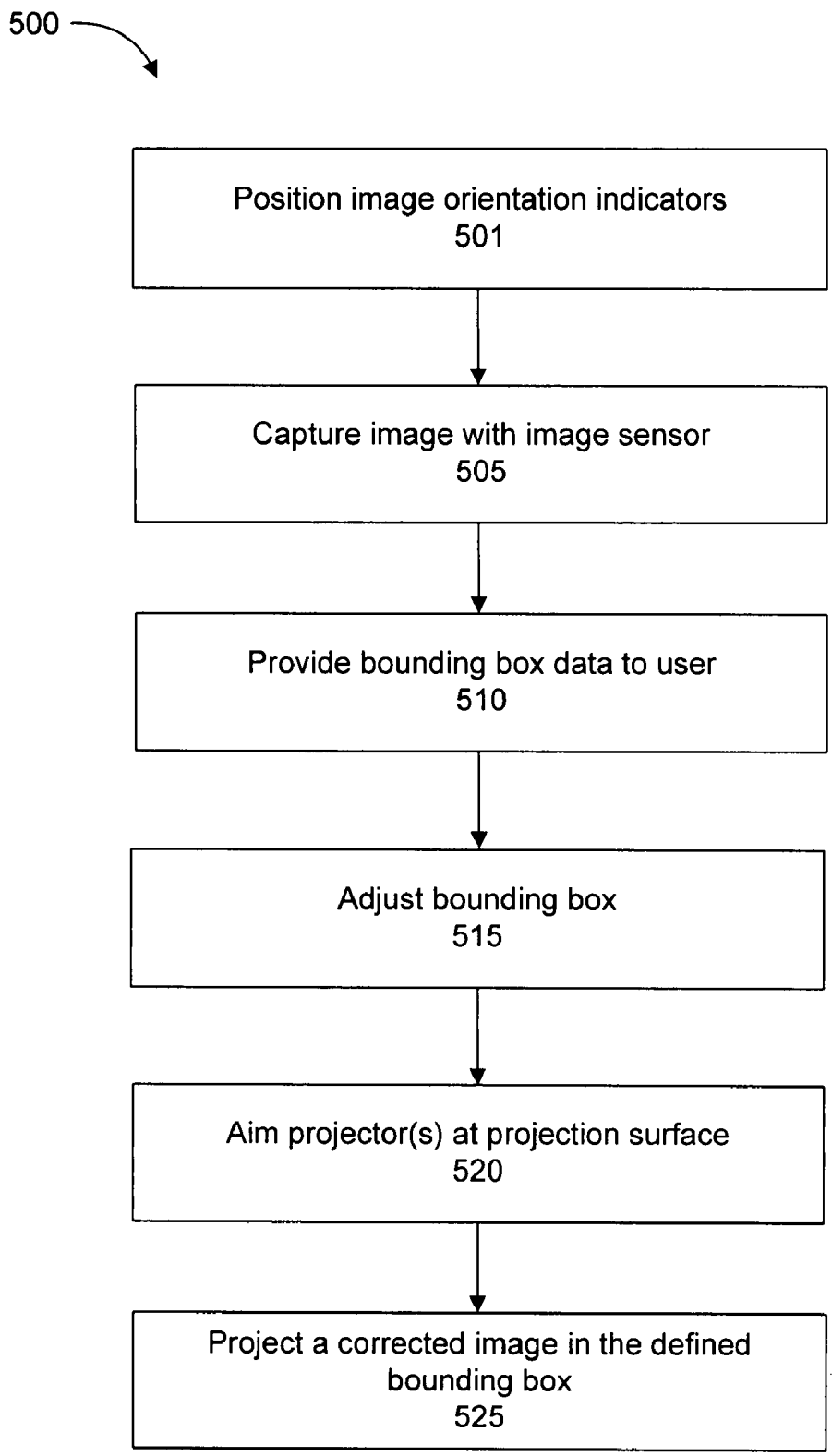
FIG. 5 is a flowchart illustrating an illustrative embodiment of a method for defining a bounding box according to principles described herein.

Referring now to FIG. 5, a flowchart is shown of an illustrative method for defining a bounding box. The method (500) illustrates a way to define a bounding box that is simpler and more intuitive than previous solutions. The first step is positioning (step 500) visible image orientation indicators that are projected onto a display surface. These indicators may be lines or dots projected from one or more optical beam generators, such as lasers. The positioning of these indicators may be performed manually or using servo or mechanical systems that reorient the beam generators producing the visible indicators.

The position of these indicators is then captured (step 505) by an image sensing device and transmitted to a computing element. The computing element determines a desired bounding box from the positioning of the indicators relative to the field of view of the image sensing device. If the computing element includes a display screen or monitor, the computing element may display a representation of the corresponding bounding box, in some cases, relative to the image to be projected or a representation thereof. In other embodiments, particularly where the indicators used are dots or points of light, the computing element may control the associated projector to including a corresponding bounding box in the image projected (step 510). In either case, the computing element may also display other information in textual or other form about the bounding box, for example, the aspect ratio (step 510).

The user may then adjust (step 515) the bounding box by manipulating an image displayed on a computer monitor or projected on the display surface, for example. The projector or projectors may then be activated and project an image towards the display surface (step 520). The image displayed (step 525) may be corrected for keystoning and other distortions before being projected so as to appear in the defined bounding box.

In some embodiments the image may be a tiled image in which a plurality of projectors are projecting a portion of the total image. This process may be iterated if desired, in order to improve or change the aspect ratio or size.

Figure 6:
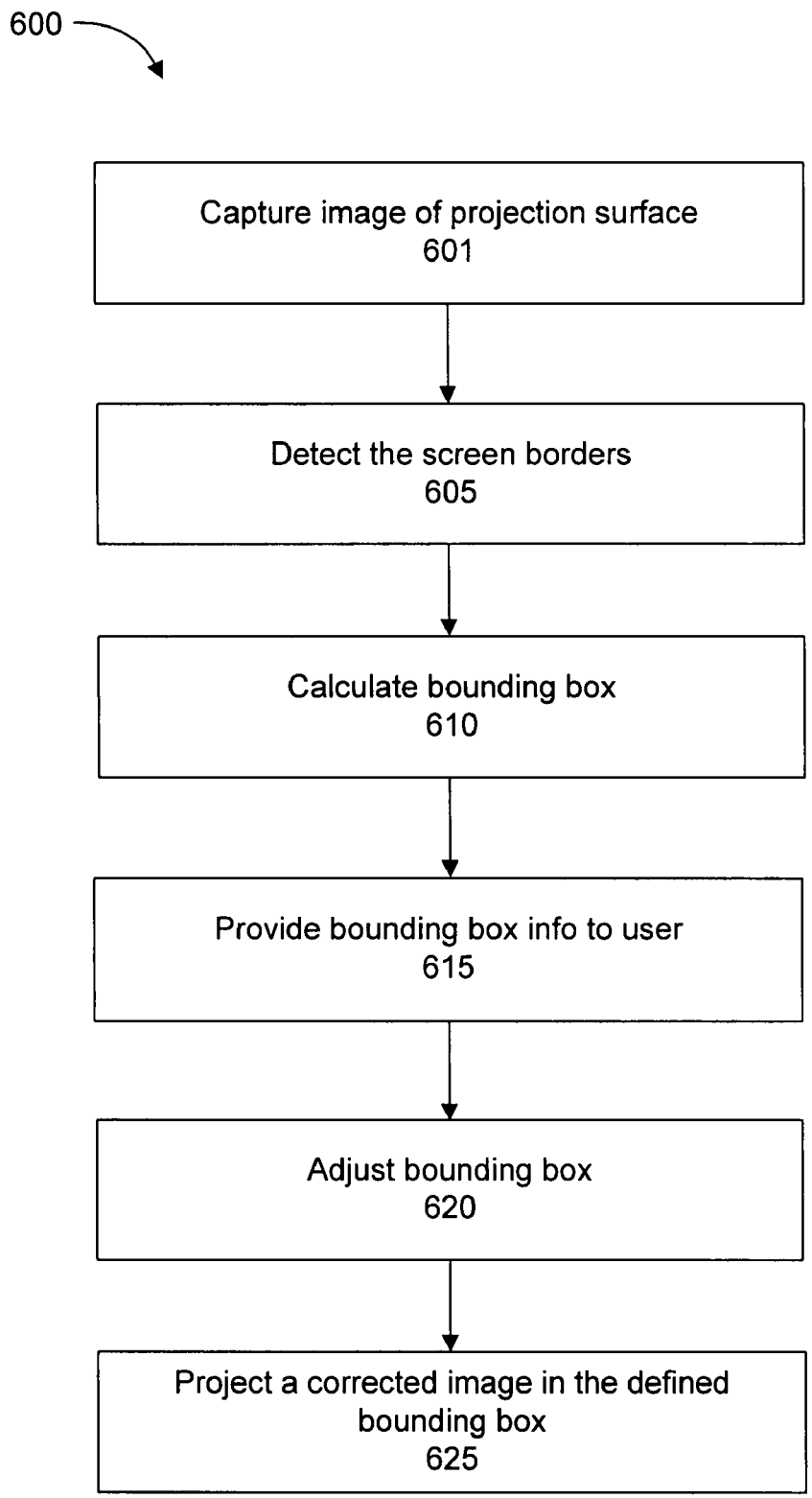
FIG. 6 is a flowchart illustrating an illustrative embodiment of a method for defining a bounding box according to principles described herein.

Referring now to FIG. 6, a flowchart is shown of another illustrative method (600) for defining a bounding box. This method (600) begins when an image sensing device such as a camera captures (step 601) an image of a display surface. A computing element will then use this image to detect (step 605) the display surface's borders or desired display area with respect to the entire display surface. For example, the method or system may include detecting the black edges of a projection screen, for example, or other elements in the captured image that correspond to the edges or boundaries of the display surface.

In another example, there may be fiducial marks on the display surface indicating the desired projection area within the display surface. In some examples, the fiducial marks may not be actual marks on the display surface, but are projected on the display device by the projector system. In which case, the user may be able to reposition the projected fiducials using the interface or controls of the projector system to define the desired bounding box.

Next, the computing element will calculate (step 610) a bounding box based on the detected boundaries or fiducial marks of the display surface. In some embodiments, this bounding box may be substantially the same size and geometry as the display surface.

Figure 7:
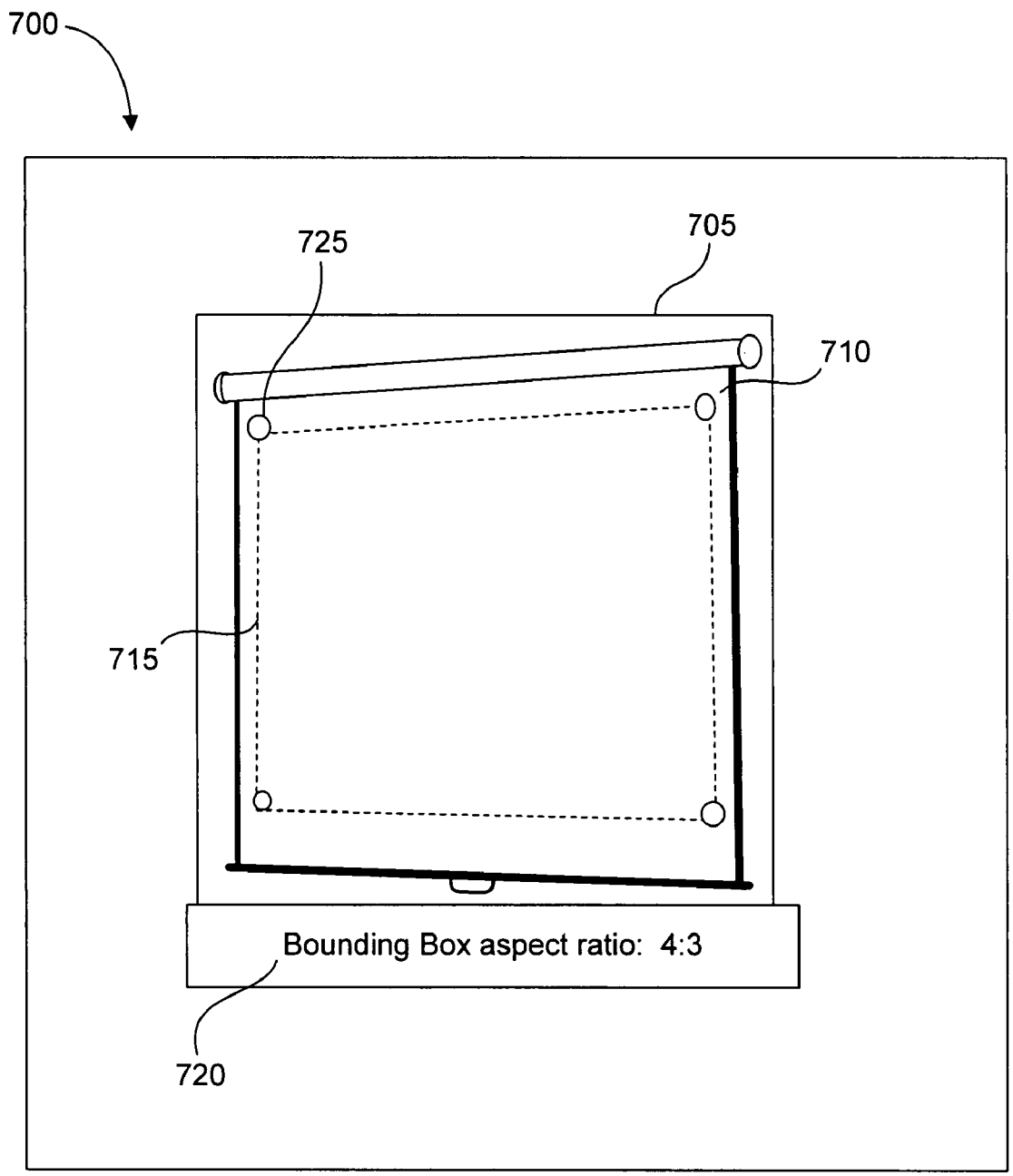
FIG. 7 is an illustration of an image that may be displayed to a user during the course of a method for defining a bounding box according to principles described herein.

The bounding box's information is then displayed (step 615) for the user. For example, the image captured by the image sensing device may be provided to the user on a computer monitor, with a bounding box overlaid on the image to be projected as shown in FIG. 7. This bounding box may then be adjusted (step 620) and an image projected (step 625) in the defined bounding box.

As mentioned above, FIG. 7 illustrates an image (700) that may be displayed on a computer screen, for example, during the course of an illustrative method. The displayed image (700) includes the image taken by the image sensing device (705), an overlaid bounding box (715), and other information (720) regarding the bounding box (715), such as its aspect ratio (720). The edges of the projection screen (710) were detected by a computing element, and the bounding box (715) was determined accordingly. Also displayed to the user may be four corner markers (725) which the user may use to alter the bounding box.

Figure 8:
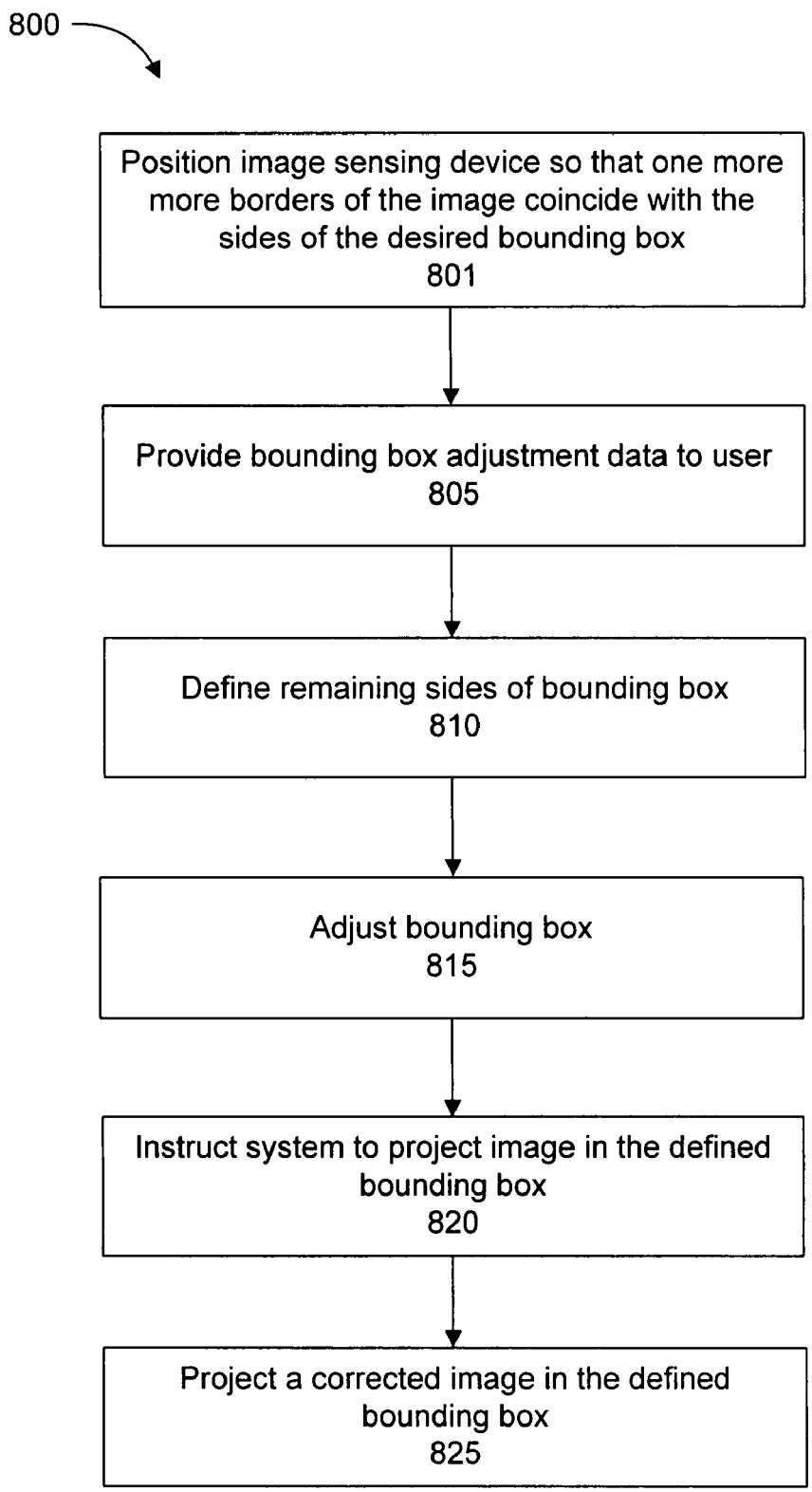
FIG. 8 is a flowchart illustrating an illustrative embodiment of a method for defining a bounding box according to principles described herein.

Referring now to FIG. 8, a flowchart is shown of another illustrative embodiment of a method (800) for determining a bounding box. The method begins by positioning (step 801) an image sensing device, such as a camera, so that one or more borders of the image captured coincide with a side of the desired bounding box. For example, the left and right sides of the image captured may be used as the left and right limits of the bounding box.

The captured image is then provided (step 805) to a computing element. With the computing element, the user may then define (step 810) the remaining sides of the bounding box, and adjust (step 815) the bounding box to the desired proportions and size relative to the display surface. In other embodiments, the computing element may automatically produce a bounding box based on the two edges of the image. In either case, the system then prepares (step 820) to project an image within the defined bounding box, and the image is then projected (step 825) in the defined bounding box.

Figure 9:
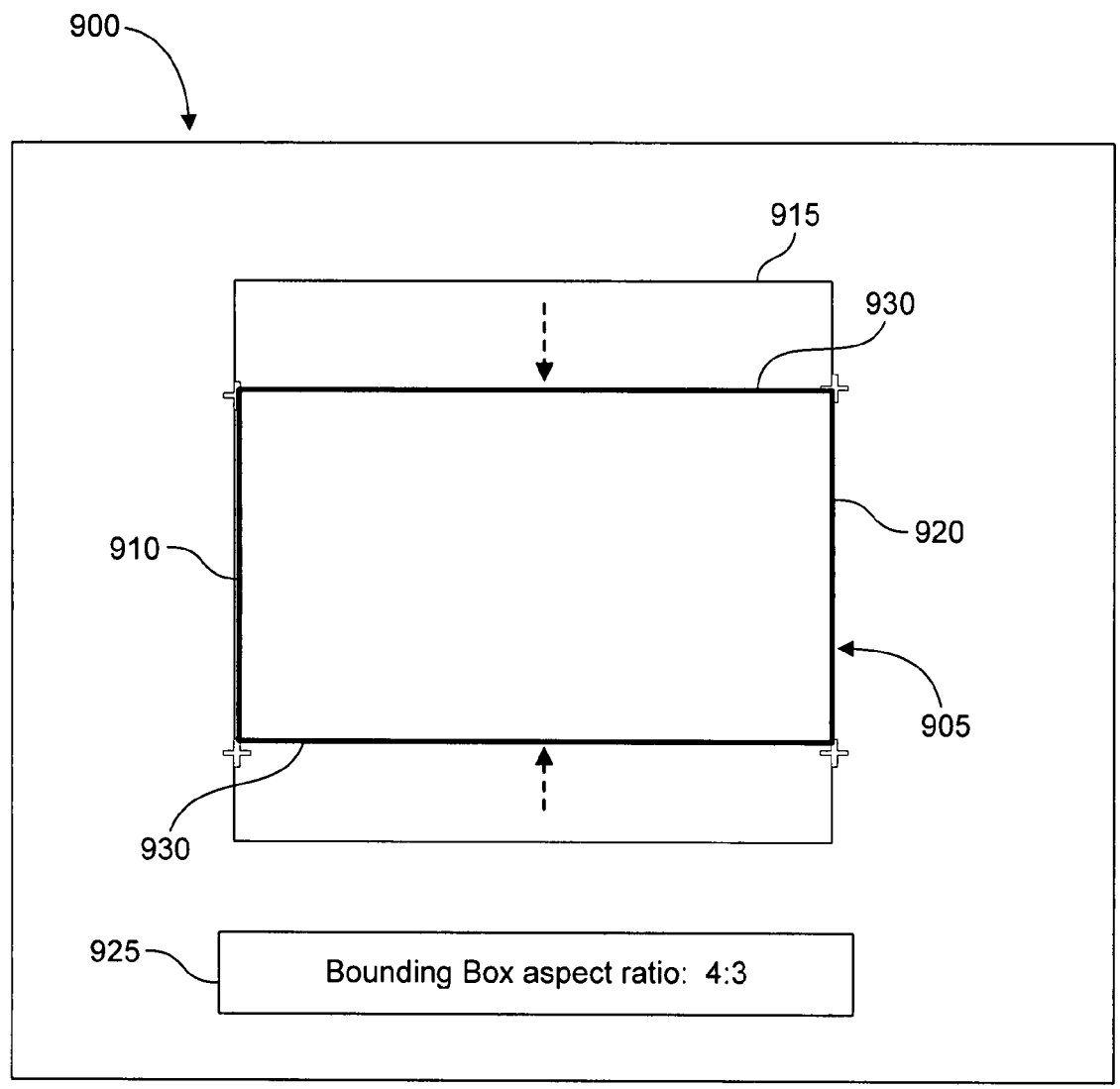
FIG. 9 is an illustration of an image that may be displayed to a user during the course of a method for defining a bounding box according to principles described herein.

FIG. 9 illustrates an image (900) that may be displayed on a computer screen, for example, during the course of the illustrative method (800) just described. The displayed image (900) includes the image (915) taken by the image sensing device, overlaid lines (930) and other information (925) regarding the bounding box (905). After the edges (910, 920) of the image (915) obtained from the image sensing device are determined, the remaining sides of the bounding box (905) are created by dragging the overlaid lines (930) into the desired positions. In the present embodiment, the left (910) and right (920) edges of the image (915) captured by the camera may be used as the left and right sides of the bounding box (905). The user may then drag horizontal lines (930) up and down in order to achieve the desired bounding box (905).

Figure 10:
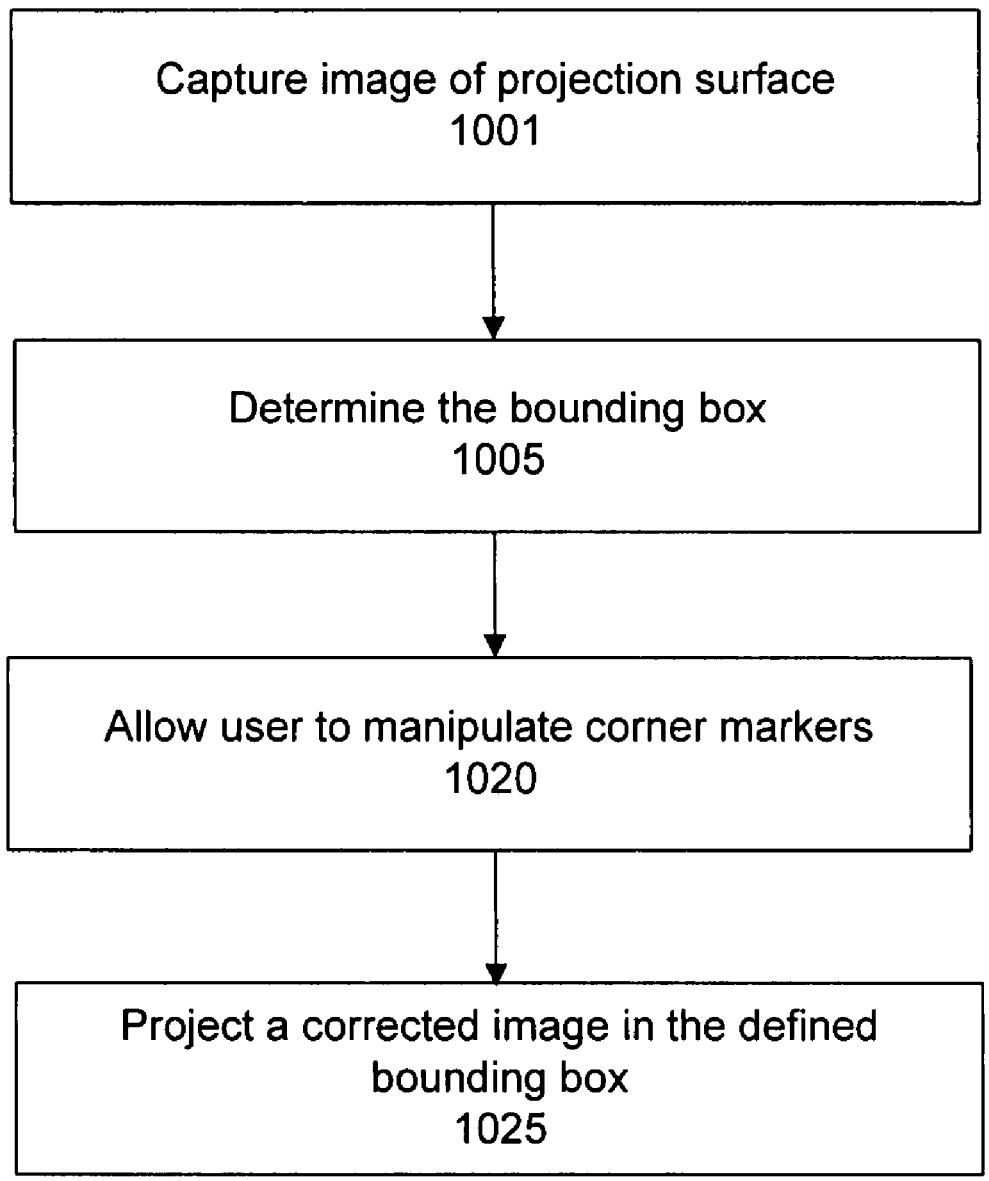
FIG. 10 is a flowchart illustrating an illustrative embodiment of a method for defining a bounding box according to principles described herein.

Turning now to FIG. 10, a flowchart of an illustrative method (1000) for defining a bounding box is shown. The method (1000) begins by capturing (step 1001) an image of the display surface. This image should include enough landmarks to allow the user to visually decide where the bounding box should be. The system may then determine (step 1005) the placement and shape of an initial bounding box by one of the methods explained above. The user may then change (step 1020) the bounding box by manipulating either corner markers or lines. These markers or lines may either be projected by the projector(s) in the system onto the display surface, or displayed on a computer screen, for example.

In one embodiment, illustrated in FIG. 11*a*, four corner markers (165) are projected by one or more projectors (110) onto the display surface. If the user desires to change the bounding box, these corner markers (165) may be manipulated through the use of a computing element, remote control device, or the like.

FIG. 11*b*, is an illustration of what a user may see on a display of a computing element. Displayed is an image (1135) captured by an image sensing device with four corner markers (165) overlaid. These corner markers may be selected and manipulated to achieve the desired bounding box (1105). Once the bounding box (1105) has been defined, the projection system may be instructed to calibrate, and a final composite image projected.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A system for defining a bounding box, said system comprising:
   one or more image projectors;
   one or more optical beam generators;
   a computing element; and
   a digital image sensor;
   wherein said digital image sensor is configured to sense a location of image orientation indicators projected onto a display surface by said optical beam generators; and
   wherein said computing element is configured to communicate with said digital image sensor to determine a bounding box defined by said locations of said image orientation indicators and to control said one or more image projectors to project an image in, and corresponding to, said bounding box on said display surface.

2. The system of claim 1, wherein said optical beam generators are laser pointers.

3. The system of claim 1, wherein said optical beam generators project visible lines.

4. The system of claim 1, wherein said computing element is configured to correct said projected image for keystoning.

5. The system of claim 1, said one or more optical beam generators comprise four optical beam generators.

6. A system for defining a bounding box, said system comprising:
   one or more image projectors;
   one or more optical beam generators;
   a computing element; and
   a digital image sensor;
   wherein said digital image sensor is configured to sense a location of image orientation indicators generated by said optical beam generators; and
   wherein said computing element is configured to communicate with said digital image sensor to determine a bounding box defined by said locations of said image orientation indicators and to control said one or more image projectors to project an image in, and corresponding to, said bounding box on said display surface;
   further comprising multiple image projectors, wherein said computing element tiles images from said multiple image projectors into said bounding box on said display surface.

7. A system for defining a bounding box, said system comprising:
   one or more image projectors;
   one or more optical beam generators;
   a computing element; and
   a digital image sensor;
   wherein said digital image sensor is configured to sense a location of image orientation indicators generated by said optical beam generators; and
   wherein said computing element is configured to communicate with said digital image sensor to determine a bounding box defined by said locations of said image orientation indicators and to control said one or more image projectors to project an image in, and corresponding to, said bounding box on said display surface;
   wherein said computing element displays said bounding box to a user.

8. The system of claim 7, wherein said computing element comprises a user interfaced with which said user can adjust said bounding box.

9. A method of defining a bounding box for an image projected from a projector, comprising:
   projecting one or more image orientation indicators from one or more optical beam generators onto a display surface;
   sensing a position of said projected image orientation indicators;
   determining a bounding box defining a desired configuration for projecting said image based on positions of said projected image orientation indicators; and
   projecting said image in, and corresponding to, said bounding box.

10. The method of claim 9, wherein said step of projecting one or more image orientation indicators further comprises projecting four simultaneous image orientation indicators from four distinct optical beam generators.

11. The method of claim 9, wherein said image orientation indicators are located at the corners of said bounding box.

12. The method of claim 9, wherein said steps of projecting and sensing image orientation indicators are repeated four times, each time projecting and sensing an image orientation indicator at a different corner of said bounding box.

13. The method of claim 9 further comprising:
displaying four corner markers;
allowing a user to move said corner markers;
sensing a new position of said corner markers;
determining a new bounding box for projecting said image based on said new position of said corner markers; and
projecting said image according to said new bounding box.

14. The method of claim 13, wherein said corner markers are projected onto said display surface by said one or more image projectors.

15. The method of claim 13, where said corner markers are moved through the use of a user interface disposed on a computing element.

16. The method of claim 9, further comprising displaying information associated with said bounding box.

17. The method of claim 16, wherein said information comprises an aspect ratio of said bounding box.

18. The method of claim 9, displaying said bounding box to a user.

19. A method of defining a bounding box for an image projected from a projector, comprising:
adjusting an image sensing device such that one or more borders of an image captured by said image sensing device coincide with one or more sides of a desired bounding box;
displaying said captured image in a software application located on a computing element;
manipulating one or more overlaid lines on said captured image to complete said desired bounding box;
determining an optimal configuration for projecting said image based on said completed bounding box; and
projecting said image according to said optimal configuration.

20. The method of claim 19, further comprising displaying information associated with said bounding box in said software application.

\* \* \* \* \*